United States Patent [19]
Wang et al.

[11] Patent Number: 5,991,695
[45] Date of Patent: Nov. 23, 1999

[54] METHOD FOR DETERMINING SEISMIC DATA TRAVELTIME FIELDS ON A MASSIVELY PARALLEL COMPUTER

[75] Inventors: David Y. Wang; Dennis E. Willen, both of Houston, Tex.

[73] Assignee: Exxon Production Research Company, Houston, Tex.

[21] Appl. No.: 09/117,529

[22] PCT Filed: Jul. 25, 1996

[86] PCT No.: PCT/US96/12261

§ 371 Date: Jan. 20, 1998

§ 102(e) Date: Jan. 20, 1998

[87] PCT Pub. No.: WO97/05558

PCT Pub. Date: Feb. 13, 1997

Related U.S. Application Data

[60] Provisional application No. 60/001,604, Jul. 28, 1995.

[51] Int. Cl.$^6$ .................................................. G06F 19/00
[52] U.S. Cl. .............................................................. 702/14
[58] Field of Search .................................. 702/14, 16, 17

[56] References Cited

U.S. PATENT DOCUMENTS

| | | | |
|---|---|---|---|
| 5,198,979 | 3/1993 | Moorhead et al. | 364/421 |
| 5,349,527 | 9/1994 | Pieprzak et al. | 364/421 |
| 5,504,678 | 4/1996 | Juszczak et al. | 702/14 |
| 5,530,646 | 6/1996 | Schoen | 702/14 |
| 5,657,223 | 8/1997 | Juszczak et al. | 702/14 |
| 5,734,829 | 3/1998 | Robinson | 702/14 |

FOREIGN PATENT DOCUMENTS

WO 96/41091  12/1996  WIPO .............................. F16J 15/26

OTHER PUBLICATIONS

W. A. Schneider, Jr., "A dynamic programming approach to first arrival traveltime computation in media with arbitrarily distributed velocities", Geophysics, vol. 57, No. 1 (Jan. 1992); pp. 39–50.

T. J. Moser, "Migration using the shortest–path method", Geophysics, vol. 59, No. 7 (Jul. 1994); pp. 1110–1120.

*Primary Examiner*—Donald E. McElheny, Jr.
*Attorney, Agent, or Firm*—S. P. Koch; F. E. Reid

[57] ABSTRACT

A method of determining traveltime fields for use in processing geophysical data. The method is implemented on a computer having massively parallel processors. The input to the method is a three-dimensional velocity model of a volume of the subsurface of the earth. The method assigns the traveltime calculations to groups of processors, which calculate traveltimes for individual shots. A preliminary simulation of the traveltime calculation process is performed to determine the number of processors required in each group. The groups of processors perform the traveltime calculations independent of the other groups. Calculations are performed in spherical coordinates, with traveltimes interpolated to a rectangular grid for storage and subsequent use. The final traveltimes are compressed in a differential format to reduce data storage and transfer requirements. A control processor is used to dynamically assign calculation tasks to processor groups, thereby ensuring load balance across all groups and maximizing throughput of the massively parallel processors.

17 Claims, 5 Drawing Sheets

METHOD FOR DETERMINING SEISMIC DATA TRAVELTIME FIELDS ON A MASSIVELY PARALLEL COMPUTER

This application claims benefit of Provisional Appl. Ser. No. 60/001,604, filed Jul. 28, 1995.

FIELD OF THE INVENTION

This invention relates to the field of geophysical prospecting. Specifically, the invention involves a method of using parallel processors to obtain traveltime fields for applications such as seismic imaging, tomographic inversion and amplitude-versus-offset analysis in three-dimensional (3-D) geometries.

BACKGROUND OF THE INVENTION

The search for subsurface hydrocarbon deposits typically involves a sequence of data acquisition, analysis, and interpretation procedures. The data acquisition phase involves use of an energy source to generate signals that propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of acoustic energy which vary as a function of time, receiver position, and source position and, most importantly, vary as a function of the physical properties of the structures from which the signals reflect. The data analyst uses these traces along with a geophysical model to develop an image of the subsurface geologic structures.

The analysis phase involves procedures that vary depending on the nature of the geological structure being investigated, and on the characteristics of the dataset itself. In general, however, the purpose of a typical seismic data processing effort is to produce an image of the geologic structure from the recorded data. That image is developed using theoretical and empirical models of the manner in which the signals are transmitted into the earth, attenuated by the subsurface strata, and reflected from the geologic structures. The quality of the final product of the data processing sequence is heavily dependent on the accuracy of these analysis procedures.

The final phase is the interpretation of the analyzed results. Specifically, the interpreter's task is to assess the extent to which subsurface hydrocarbon deposits are present, thereby aiding such decisions as whether additional exploratory drilling is warranted or what an optimum hydrocarbon recovery scenario may be. In that assessment, the interpretation of the image involves a variety of different efforts. For example, the interpreter often studies the imaged results to obtain an understanding of the regional subsurface geology. This may involve marking main structural features, such as faults, synclines and anticlines. Thereafter, a preliminary contouring of horizons may be performed. A subsequent step of continuously tracking horizons across the various vertical sections, with correlations of the interpreted faults, may also occur. As is clearly understood in the art, the quality and accuracy of the results of the data analysis step of the seismic sequence have a significant impact on the accuracy and usefulness of the results of this interpretation phase.

In principle, the seismic image can be developed using a three-dimensional geophysical model of seismic wave propagation, thereby facilitating accurate depth and azimuthal scaling of all reflections in the data. Accurately specified reflections greatly simplify data interpretation, since the interpretational focus can be on the nature of the geologic structure involved and not on the accuracy of the image. Unfortunately, three dimensional geophysical models frequently require intolerably long computation times, and seismic analysts are forced to simplify the data processing effort as much as possible to reduce the burdens of both analysis time and cost.

In addition to the 3-D computation challenge, the analyst faces a processing volume challenge. For example, a typical data acquisition exercise may involve hundreds to hundreds of thousands of source locations, with each source location having hundreds of receiver locations. Because each source-receiver pair may make a valuable contribution to the desired output image, the data handling load (i.e., the input/output data transfer demand) can be a burden in itself, independent of the computation burden.

FIG. 1 depicts a perspective view of a region 20 of the earth for which a geophysical image is desired. On the surface 18 of the earth are shown a number of shot lines 2 along which the seismic data are acquired. As shown in FIG. 1A, shot lines 2 consist of a sequence of positions at which a seismic source 3 is placed and from which seismic signals with ray paths 5 are transmitted into the earth. Receivers 4 placed along each line receive the signals from each source position after reflection from various subsurface reflectors 6.

A first method of managing the seismic data burdens discussed above involves careful definition of the region over which the data are acquired. Specifically, use of any available preliminary geologic and geophysical information may facilitate the minimization of the surface area over which seismic data may need to be acquired. Such a minimization will directly reduce the amount of data that is ultimately acquired. Furthermore, similarly careful planning of the spacing between shot lines will optimize the analysis effort by reducing data volume. And finally, optimization of the number of sources and receivers that are used, and of the spacing between adjacent source and receiver positions, will also benefit the data analyst.

None of these efforts can be accomplished without a penalty. For example, relatively wide spacing between shot lines, or between sources and receivers, reduce the resolution of the computed seismic image, thus making interpretation more difficult. In addition, complex geologic features may not be resolvable without relatively close spacing. And finally, certain data acquisition exercises, such as in relatively unexplored areas, do not allow optimization of the surface area over which data is to be acquired. As a result, the data handling burden cannot be entirely eliminated through data acquisition planning.

The recent availability of massively parallel processors offers a significant opportunity to seismic data analysts. Massively parallel processors (MPPs) have multiple central processing units (CPUs) which can perform simultaneous computations. By efficient use of these CPUs, the weeks or months previously required for complex analyses can be reduced to a few days, or perhaps a few hours. However, this significant advantage can only be realized if efficient computational algorithms are encoded in the MPP software. Thus, the opportunity MPPs offer seismic data analysts also creates a challenge for the development of suitable computational algorithms that take advantage of the multiple CPUs.

This challenge can be easily discussed by considering the manner in which computational algorithms have most commonly been written for existing seismic analysis routines.

Until recently, computers relied on a mode of operation referred to as sequential computing. Sequential computing involves use of analytic routines that perform only a single procedure, or perhaps focus on a single subset of the data or image, at any given time. This is a direct result of a computer having only one CPU. For that reason, the only optimization procedures that can be employed on single CPU computers are those which increase the efficiency of the processing as to the procedure or subset. Because all calculations must ultimately be performed by that single CPU, however, the options for obtaining high performance are innately limited.

On the other hand, the multiple CPU capability of MPPs offers an obvious simultaneous computation advantage. This advantage is that the total time required to solve a computational problem can be reduced by subdividing the work to be done among the various CPUs, provided that the subdivision allows each CPU to perform useful work while the other CPUs are also performing work. Unfortunately, the disadvantage of multiple CPU hardware is that the sequential processing methods that have long been used in software development must be replaced by more appropriate parallelized computing methods. Simply stated, MPPs require that processing methods be developed which make efficient use of the multiple CPU hardware. Ideally, these methods should organize the distribution of work relatively evenly among the processors, and ensure that all processors are performing necessary computations all of the time, rather than awaiting intermediate results from other processors.

The challenge of defining parallelized processing methods, and of optimizing those parallelized methods once defined, is particularly acute in the seismic data processing arena. Seismic data consists generally of a large number of individual traces, each recorded somewhat independently of the other traces. Logically enough, sequential computing methods that require the analytic focus to be placed on a single calculation at a time adapt well to analysis of these independent traces. This is true even though computational bottlenecks may exist. For example, portions of the analytic sequence may require relatively more computation time than other portions, must be completed before other calculations may proceed, or may rely on similar input data as other traces, for example traveltimes. Since no simultaneous computations occur in sequential processing, none of these bottlenecks lead to a reduction in computational efficiency with a single CPU, except as to the total processing time that is required. Except as to that total time requirement, the existence of such computational bottlenecks does not otherwise pose problems for the analyst. To take full advantage of MPP computing capabilities, however, where the goal is to perform simultaneous processing in all CPUs, methods for optimizing the seismic analysis phase by eliminating such bottlenecks must be developed.

This advantage of an MPP becomes clear by considering the limitation which calculation time places on image region size in single CPU computers. Increasing the size of the image, e.g., by expanding the size of cube 20 in FIG. 1, or increasing the amount of data to be processed, e.g., by adding additional sources 3 and receivers 4 to shotlines 2, increase the total computation. That direct impact on calculation time places a heavy burden on seismic analysts to optimize image size, especially since even small image regions may require weeks of computation time on even the highest speed sequential processing computers. In contrast, efficient processing on MPPs, which may have as many as or more than 256 individual CPUs, should only involve minimally lengthened computation times, since each CPU would assume just a fraction, for example $1/256$, of the additional work required by the larger region. This potential for scalability of the image region and the work load required in image generation is a principal benefit of MPPs, a benefit that can only be realized if parallelized seismic processing methods allowing such workload scalability are developed.

Basic considerations for determining efficient parallelized seismic processing methods become evident by reconsidering the above review of the seismic analysis process. As noted, the purpose of seismic analysis is to analyze measured seismic data using geophysical models to develop images of the subsurface. Therefore, each of three principal processing components—data, model, and image—may be considered to be a candidate for distributing computational work among the various processors in an MPP. One option for distributing work among the processors would be to assign different groups of the input seismic trace data to different processors. For example, traces may be grouped by source locations, with different processors being assigned different groups. Similarly, the output image could be subdivided and assigned to different processors. Finally, it may also be possible to subdivide the geophysical model used to generate the output image into groupings that can be assigned to the various processors. (That model is generally considered to be embodied in the arithmetic operations required by the mathematical model that is the subject of the processing effort. For example, in seismic analysis the mathematical model is often based on the wave equation). For example, the data may be transformed into the frequency domain, with individual frequencies assigned to individual processors. It may also be possible to develop combinations of these approaches. For example, groups of processors may be assigned collective responsibility for specific frequencies in the model and all depths in the image, while having individual responsibility for specific horizontal locations in the image. The challenge to the seismic data analyst is to determine methods of subdividing the seismic data, model, and image into components that can be assigned to individual processors in the MPP, thus allowing calculations to be performed in each processor independently of other processors. This subdivision of seismic data analysis into individual components is commonly referred to as seismic decomposition.

One type of MPP has from thousands to tens of thousands of relatively unsophisticated processing elements. In this kind of machine, the processing elements typically perform the same operation on multiple data streams, a Single Instruction, Multiple Data stream (SIMD) machine. An example is the CM2, a product of the Thinking Machines Corporation. These kinds of machines typically lack shared memory, i.e., each processor has its own separate memory unit and the information in the memory cannot be directly accessed by other processors. The individual processors typically have limited computing capability and memory. Because of the large number of processing elements and a lack of shared memory, data transfer between the processing elements is a major bottleneck in efficient utilization of the capability of the machines. Even with sophisticated interconnection techniques, such as in a hypercube arrangement, transfer of data between processors is a major factor in the running time of programs.

Other computers have much more powerful elements in arrays of tens or hundreds. The T3D, a product of Cray Research Corporation, is an example of this kind of machine. Besides having individual processing elements that are much more powerful than those in the CM2, the T3D has fewer of the elements and a physically distributed, logically shared memory. This Multiple Instruction Multiple Data stream (MIMD) machine has different elements performing different operations on different parts of the data at the same time. The reduced number of processing elements means that data does not have to be transferred to as many elements as in a SIMD machine. Because of the increased sophistication and cost of the individual elements and because of their fewer numbers, efficient utilization requires that the load on the processing elements be balanced. An additional factor is that each processing element must accommodate a larger subset of the overall data volume; computations that involve sorting of the data could become more complicated.

U.S. Pat. No. 5,504,678, issued to Jusczak, Willen and Rendleman, and copending application Ser. No. 08/439834 of Jusczak and Willen disclose an MPP method of prestack depth migration. One of the input requirements of both inventions is a traveltime field corresponding to the 3-D data volume of interest. Specifically, the traveltimes from a surface grid of shot (or receiver) positions to a 3-D grid of subsurface positions must be available to the processing elements of the MPP. The efficient generation of those traveltime fields is one of the challenges which face geophysical analysts.

There are other contexts in which it is necessary to have a 3-D traveltime field for seismic data analysis. For example, in the development of known hydrocarbon reservoirs, tomographic inversion is becoming an increasingly common technique. In this technique, a multiplicity of receivers in a number of wells record traveltimes from a multiplicity of shots placed in a number of other, possibly different, wells. The measured traveltimes are compared to the calculated traveltimes for an initial velocity model of the subsurface and used to obtain an improved velocity model of the subsurface. This improved velocity model is a useful aid in interpretation of the structure of the subsurface and the fluids in the data volume encompassed by the wells.

U.S. Pat. No. 5,394,325 issued to Schneider teaches a method for calculation of traveltimes in a 3-D data volume. The process involves a finite-difference solution to the eikonal equation in spherical coordinates, with refinements to increase the stability of the calculation and cope with numerical roundoff error as well as turning-ray problems. The resulting 3-D grid of traveltimes are useful in depth migration, velocity analysis, raytracing for modeling of synthetic seismograms, 3-D traveltime inversion, and map migration. An alternate, uniform grid, approach to traveltime calculations is given in Schneider, W. A., Jr., Ranzinger, K. A., Balch, A. H., and Kruse, C., *A dynamic programming approach to first arrival traveltime computation in media with arbitrarily distributed velocities,* 57 Geophysics 39, (January 1992). However, the calculation schemes of both Schneider and Schneider et. al. cannot be directly implemented on an MPP without resolving such problems as memory allocation, load balancing and handling of communication between the processing elements. And without resolving those problems, the improvements in the art disclosed in the Jusczak et al patent and co-pending application cannot be fully utilized by industry.

There are other methods that have been used for computations of traveltime fields. Those based on wave-equation modeling would be familiar to those knowledgeable in the art. A method based on application of Fermat's principle was disclosed in Moser, T. J., *Migration using the shortest-path method,* 59 Geophysics 1110 (1994). The results of this method are comparable to the results of the finite-difference solution of the eikonal equation. Like Schneider's invention and other eikonal equation solvers, the shortest path method constructs the traveltimes on the entire grid simultaneously in one run of calculations, avoiding the convergence problems associated with classical ray-tracing. For that reason, however, implementation of these schemes on an MPP will suffer from the same problems noted above in conjunction with Schneider et al.

As hydrocarbon explorationists examine increasingly complex structural areas, poststack migration (or partial prestack migration) techniques and methods based on Fourier transformation are inadequate to image the subsurface data volumes. Only prestack migration will suffice. This, of course, requires computation of a traveltime field. The present invention meets the need for an efficient MPP implementation of a process that determines traveltimes for seismic data analysis in hydrocarbon exploration and production.

SUMMARY OF THE INVENTION

The present invention is a method of using parallel processors, preferably a massively parallel processor (MPP), to compute traveltime fields for a 3-D volume of the subsurface of the earth. The input to the process is either a velocity model or a slowness model of the 3-D volume. The end product of the invention is a set of traveltimes on a 3-D grid over this volume. As is known to those skilled in the art, such a grid is necessary for integral-type migration of seismic data.

The invention, in a preferred embodiment, starts with a 3-D rectangular grid of velocities or slowness defined in (x, y, z) coordinates. For purposes of this specification and appended claims, slowness is defined as the reciprocal of velocity. A finite difference solution of the eikonal equation in 3-D spherical coordinates is used to compute the traveltimes for acoustic waves emanating from the shot location.

The resulting traveltimes are interpolated to give a traveltime field on a rectangular 3-D grid.

The present invention provides for decomposition of the task of traveltime computations onto groups of processors associated with individual shots. This decomposition allows for maximization of the number of processors that are assigned to analysis tasks, thus increasing overall throughput. As part of the present invention, an initial computation of the total memory required for each shot is used to determine the number of processors in a group.

Within each processor group, the individual processors perform the traveltime calculations for a number of y-slices for a portion of the data volume, preferably, but not necessarily, centered at the shot position. Each processor performs its traveltime computations independent of each other processor. Data transfer between processors handling adjacent y-slices facilitate the independent computations. The groups of processors used in the analysis are under the direction of a control processor that can dynamically assign work to processor groups. This ensures that the load on the processors is balanced, thus efficiently taking advantage of the computational capabilities of the MPP.

After the traveltimes have been computed in the spherical coordinate system, they are interpolated back onto a rectangular coordinate system and written out on disk, tape or other mass storage device for use in other processes such as migration or tomographic inversion.

BRIEF DESCRIPTION OF THE DRAWINGS

The present invention and its advantages will be more easily understood by reference to the following detailed description and the attached drawings and tables in which.

DETAILED DESCRIPTION OF THE INVENTION

The present invention is a method of using a massively parallel processor to obtain traveltime fields in a portion of the subsurface of the earth. The method may be employed on any type of parallel processing computer that has more than one processor available to perform analysis and/or input/output tasks. For example, a Cray Y-MP, which has up to eight processors may be employed. Networked personal computers or workstations may also be employed. In a preferred embodiment, the method will be employed on a massively parallel processor (MPP) having 64 or more processing elements ("PEs"). One example of such an MPP is the T3D made by the Cray Research Corporation. For convenience, and not to be construed as limiting, the abbreviation MPP will be used herein to refer to any parallel processing computer suitable for the present method. However, use of MPP in that manner is in no way to be construed as limiting application of the present method to solely those computers deemed by the commercial marketplace to be massively parallel.

Figure 1:
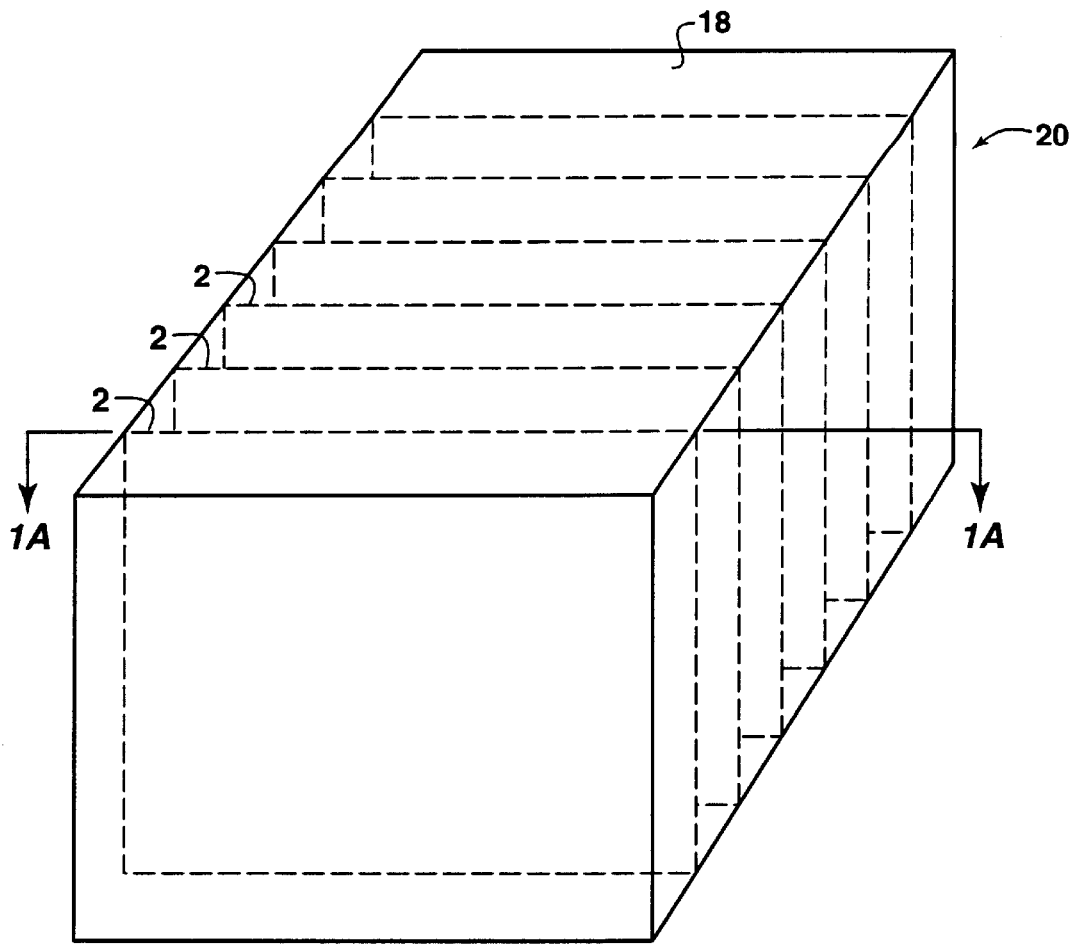
FIGS. 1 and 1A schematically illustrate the data acquisition configuration typically used in 3-D seismic exploration.
Figure 1A:
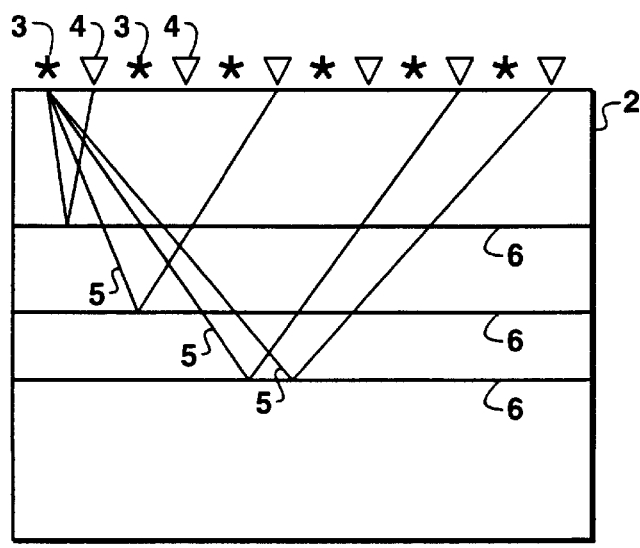

As is well known, seismic data processing methods generally start with data from a portion of the earth's surface. FIG. 1 depicts a perspective view of a region 20 of the earth for which a geophysical image is desired. On surface 18 of the earth are shown a number of shot lines 2 along which the seismic data are acquired. As shown in FIG. 1A, shot lines 2 consist of a sequence of positions at which a seismic source 3 is placed and from which seismic signals with ray paths 5 are transmitted into the earth. Receivers 4 placed along each line receive the signals from each source position after reflection from various subsurface reflectors 6.

The process of prestack depth migration in the time-space domain requires the computation of traveltimes for seismic waves emanating from a grid of surface locations down to a 3-D grid of subsurface positions in the data. The sampling in the horizontal directions of this volume may be different from the sampling in the vertical direction and may also be different from the shot, receiver and line spacing used in the acquisition of the 3-D data set. This will be familiar to those knowledgeable in the art.

Figure 2:
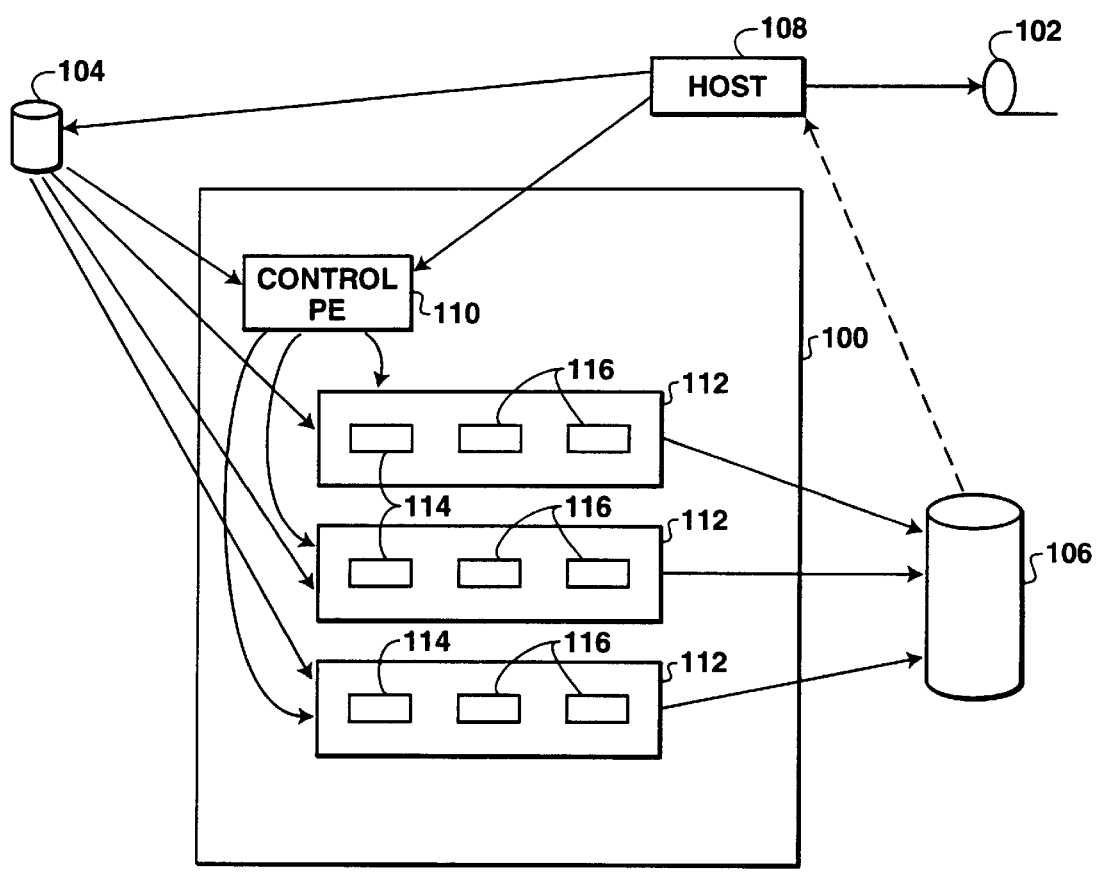
FIG. 2 depicts a simplified functional block diagram of a parallel processing system on which traveltime field determination using the present method may be performed.

The description of the present method of computing traveltimes may be simplified by describing one embodiment of an MPP system on which the method may be implemented. As depicted in FIG. 2, the components of the MPP system will typically consist of an MPP 100, a data tape storage facility 102, data disks 104, output disks 106, and a host computer 108.

The presence of the host computer is not a limitation of the present invention. The tasks performed by the host computer could be performed by the PE described below as the control PE. In a preferred embodiment, the MPP 100 should be capable of performing in the multiple instruction stream/multiple data stream mode of operation (MIMD). This mode of operation allows each processor to perform different tasks simultaneously and on different sets of data, if programmed to do so. The method may also be advantageously employed on computers using other modes of operation, for example single instruction stream/multiple data stream (SIMD). This mode of operation has all processors simultaneously performing the same tasks, but on different sets of data. An MPP suitable for use is the T3D manufactured by Cray Research, Inc., which is a MIMD MPP. Other MPP systems suitable for processing seismic data using the present method will be known to those skilled in the art. For the purposes of this invention, one of the PEs in MPP, 100, is designated as the control PE, 110. The other PEs in the preferred embodiment are partitioned into groups of analysis PEs, 112. Within each group of analysis PEs, one PE is designated as the lead PE, 114. The other PEs, 116, in each group are more limited in their activities than the lead PE in each group. The control PE, 110, is a necessary part of the preferred embodiment, whereas the tasks performed by the lead PEs, 114, could easily be done by the other PEs, 116, in each group of PEs, 112.

The host computer, 108, stores a velocity model for the region 20 in FIG. 1 on data disks, 104, as slowness information (slowness is the reciprocal of the velocity). This is a matter of computational efficiency because the computations of traveltimes involve multiplication by the slowness. The slowness data are stored in y-slices.

The analyst designates, as an input parameter to the host 108, the shot positions for which traveltime computations are needed. Usually, the shot positions will be along a number of lines, 2, on the surface of the 3-D volume corresponding to the lines of data acquisition. The designated positions are transferred by the host to the control PE, 110.

The present invention performs a finite difference solution of a partial differential equation with an adaptive step size. It will be appreciated by those knowledgeable in the art that, at the outset, in a scheme for solution of finite difference equations with an adaptive step size, the memory allocation requirements for the PEs is difficult to predict. Specifically, in the present method it is desirable to obtain an estimate of the number of PEs that will be required in each group to compute and store the traveltimes for the traveltime subregion the analyst selects for the family of shot positions to be assigned to the group. The traveltime subregion is a rectangular parallelepiped volume that encloses the shot location over which the traveltime fields are to be computed. The top of the subregion can be a square with its lateral dimensions defined by an analyst-specified input parameter. Or, it can be a rectangular defined by two separate input parameters—one parameter for each horizontal direction of surface 18 in FIG. 1. Generally, the vertical dimension of the traveltime computation will be to the maximum depth of region 20. To estimate the number of PEs required in each group, a limited traveltime calculation simulation is performed, as discussed in the next two paragraphs.

The limited simulation consists of selecting two shot locations, 3, for every line, 2, on surface 18. For a typical survey, this means that simulations are carried out for several hundred shot locations. The initial simulation is performed with only one group 112 and with one PE in the group. For each shot, spherical computation fronts are propagated with a fixed radial increment. For purposes of this simulation, this radial increment is set equal to one-tenth of the maximum step size that is permissible in the actual traveltime calculations. The radial increment and step size parameters are discussed further below in reference to FIG. 3. This simulation itself is merely a number counting exercise to determine the maximum number of traveltime points that would have to be stored in the memory of an individual PE. Traveltime sampling density considerations are also discussed below in reference to FIG. 3. If the memory requirement exceeds the memory which is available on a single PE, the simulation is repeated using two PEs in the group. If two PEs are not sufficient, the number is increased to three, and so on. Based on this simulation, the control PE, 110, makes a decision on the number of PEs that are allocated to each group, 112. Typically, the number is between one and three. Tests of the present method indicate that, for datasets of typical interest to geophysical analysts, more than three PEs per group will rarely be required. If necessary, however, this number can be changed during processing, as is discussed further below.

Based on this initial allocation, the control PE passes to the lead PE, 114, in each group, 112, the shot location associated with the group and the subregion over which the group is to compute traveltimes. The traveltime computations are performed by each group of PEs for their designated shot locations independently of the other groups of PEs. The shot locations passed to the lead PE may be a fixed initial table of locations to be assigned to the group, or may simply be the first location to be handled by the group. The latter option facilitates the dynamic load balancing feature of the present method which is discussed further below.

Figure 6:
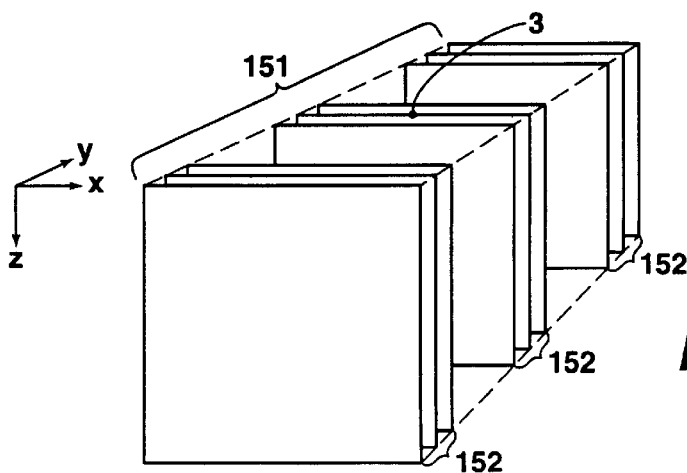
FIG. 6 depicts a preferred allocation of traveltime calculation tasks for a single group of PEs.

FIG. 6 illustrates the allocation of tasks between the PEs in each group 112. An exploded view of the 3-D subregion 151 of the overall data volume, 20, from FIG. 1 is shown. This is the portion of data volume 20 for which a particular group of processors, 112 in FIG. 2, will be performing traveltime calculations. A shot location, 3, on the surface of the earth is also indicated.

In FIG. 6, each of the PEs in the group 112 is allocated a number of y-slices, 152, within subregion 151 for which each PE will perform traveltime calculations. This y-slice allocation corresponds to both the input slowness data and the output traveltime data. As described below, the y-slices will be identical within subregion 151 for both the slowness and the traveltime data. However, the present method is not limited to embodiments in which the slowness and traveltime y-slices are identically-distributed; rather the traveltime y-slices may be more or less densely distributed through subregion 151 depending on the needs of the analysis to be performed. Each of the PEs in the group will be responsible for a different set of slices, 152. At this point, there is no distinction between the lead PE in a group, 114, and the remaining PEs, 116. Note that the distance between the traveltime slices may be unrelated to the spacing between the seismic lines 2 in FIG. 1. Note also that the y-slices are shown in groups of three; this is for purposes of illustration only and is not to be construed as a limitation. Finally, note also that the lead PE, 114, may determine the number of y-slices to be allocated to each PE 116 in the group, or, alternatively, that number may be input by the analyst.

Every PE in each group, 112, obtains the slowness information it requires from the data disk, 104. The slowness data will generally be stored on disk in y-slice format, but that is not a limitation of the present method. Initially, the slowness form data are on a rectangular three dimensional grid of the subsurface, 121. On the other hand, the traveltime computations are performed in spherical coordinates (r, θ,φ), and part of the present method involves the interpolation of slownesses in spherical coordinates from the slownesses in rectangular coordinates.

Figure 4:
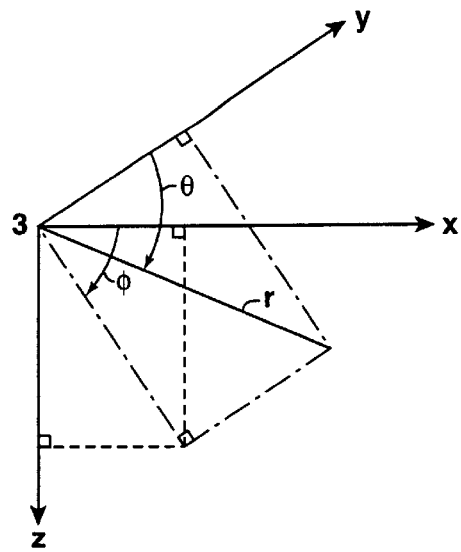
FIG. 4 shows the relation between the rectangular coordinate system and the spherical coordinate system of the invention.

The relationship between the spherical coordinates (r, θ, φ) and the rectangular coordinates (x, y, z) is shown in FIG. 4. The origin of the coordinate system is at the shot location 3. Instead of the conventional spherical coordinate system, wherein the angle θ is measured from the vertical z-axis, in the preferred embodiment, θ is measured from the y-axis to the line defined by r. The angle φ is an angle lying in the x-z plane which is measured from the x-y plane to a plane containing r and the y-axis. In the preferred embodiment, the relationship between the two coordinate systems is defined by the following equations:

$$x = r \sin \theta \cos \phi$$

$$y = r \cos \theta$$

$$z = r \sin \theta \sin \phi$$

The allocation of tasks within a processor group, 112, to y-slices is a matter of computational efficiency. The choice of partitioning the data volume in rectangular coordinates rather than the spherical coordinates in which calculations are performed arises because each processor has to have access to the slowness information for the calculations, and the slowness information is stored in rectangular coordinates. If the partitioning were done in spherical coordinates, an extra interpolation step would be necessary to take the slowness specified in rectangular coordinates and convert it to a value in spherical coordinates.

Next, it is generally not desirable to do a partitioning based upon depth slices. Because of the manner in which traveltime calculations are carried out (from the surface downward), depth slicing would mean that the PEs responsible for deeper traveltime computations would be idle while the shallow traveltimes were being computed. Finally, the choice of y-slices arises because the coordinate system in which the calculations are performed measures θ from the y-axis. A constant θ corresponds to a circular arc on a constant y-plane. This way, each PE can operate on a range of θs and on all φs for each θ, which therefore corresponds to the range of y-slices assigned to that PE. As is discussed below, implementation on an MPP requires communication across the boundaries between PEs processing adjacent slices. The extra data points that have to be communicated between PEs processing adjacent slices are on a ring of constant θ and can be very easily indexed. This advantage of the present method is discussed further below in reference to FIG. 8 (Alternatively, those familiar with the art would recognize the present method as being equivalent to one in which the partitioning is done on x-slices and the angle θ measured from the x axis.).

Those knowledgeable in the art would also recognize that the computational advantages of vertical slices accrue only when the source positions are on the surface. For applications in which the sources are below the surface of the earth, such as reverse VSPs and crosswell tomography, it may be preferable to have each PE within a group be responsible for a depth (i.e. horizontal) slice. The disclosure in the present application of vertical slices is not to be construed as a limitation.

FIG. 6 shows the shot position, 3, as being in the center of the upper surface of the subregion 151 volume. This is for computational efficiency; when there are an odd number of PEs in a group the idle time of adjacent processors in the group is reduced, as is discussed further below in relation to FIGS. 7A and 7B. If, on the other hand, there are an even number of PEs in a group, the shot position would be positioned as close as possible to the middle of the subregion 151, but still within one PE. Those knowledgeable in the art will recognize that such a placement may not always be feasible. For example, such a placement is not possible when the shot position coincided with a corner of subregion 151, allocated to the group of processors, 112.

The process of calculating traveltimes in each PE is discussed with reference to FIG. 3, which follows the steps given by Schneider. The input information discussed above corresponds to step 121 of FIG. 3.

Figure 3:
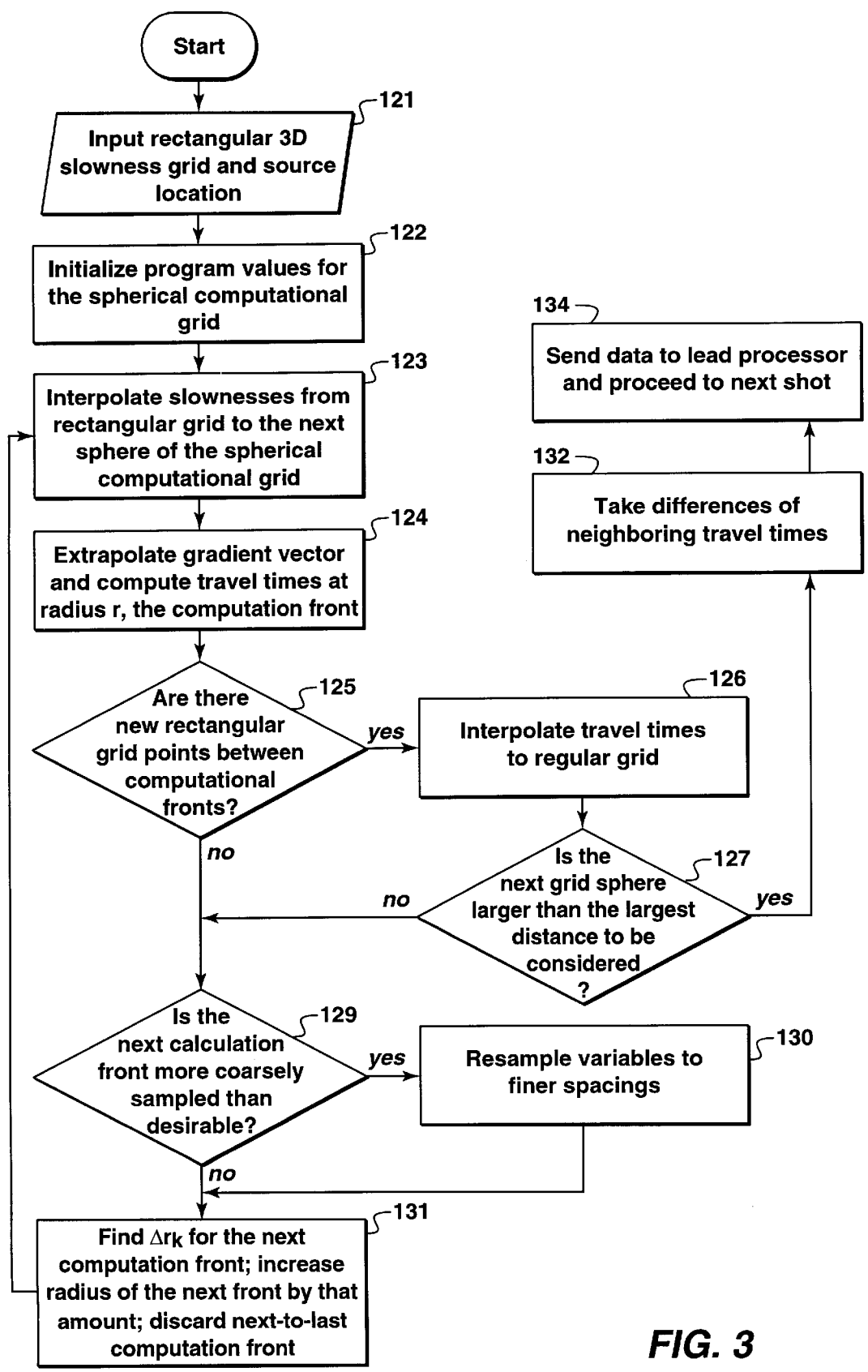
FIG. 3 depicts a block diagram of the steps involved in the traveltime computation by each processing element.

The following initial conditions for the advancing spherical computational fronts are set in step 122 of FIG. 3:

(a) The maximum radius, $r_{max}$, is determined by selecting that corner of subregion 151 which is farthest from the shot location. This would be the distance from the shot location 3 to one of the bottom corners of subregion 151.

(b) The maximum incremental radial and minimum angular values for the traveltime grid, $\Delta r_{max}$, $\Delta\theta_{min}$, and $\Delta\phi_{min}$, are set. The incremental radius will be set equal to the minimum grid spacing in the rectangular grid, whether it is in the x, y or z direction. Mathematically, $\Delta r = \min\{\Delta x, \Delta y, \Delta z\}$ where $\Delta x$, $\Delta y$, and $\Delta z$ the grid sizes in the three respective directions. This ensures that the computations will not occur on a coarser scale than that found in the rectangular grid. The incremental angles are set equal to said minimum grid spacing divided by $r_{max}$.

(c) The minimum radial increment is then set at some fraction of $\Delta r_{max}$. It has been found by experiment that $\Delta r_{min} = 0.1 \Delta r_{max}$ gives good results. Larger fractions increase error, while smaller fractions reduce efficiency of the calculation.

(d) The initial radial and angular increments $\Delta r$, $\Delta\theta$, and $\Delta\phi$ are set for the first extrapolation step. The initial radial increment is set to nine-tenths of $\Delta r_{max}$, while the angular increments are set to roughly 0.1 radians, as a result of a calculation set forth in the disclosure of Schneider.

(e) The initial conditions for all the variables at the location of the source are set.

After the initialization steps, the slownesses are interpolated from the rectangular grid to the spherical computation front at the first radius, 123, which is determined by the initial radial increment. This process of interpolation from a rectangular grid to a spherical grid would be familiar to those knowledgeable in the art.

The three components of the traveltime gradient vector at the initial radius are extrapolated at step 124 to the next radius via an advancing calculation front and the traveltime t is computed for each point on the calculation front at the new radius. In a preferred embodiment this is performed using the method of Schneider. After the calculations for the new radius are made, the radius of the new front and that of the previous front are checked against the rectangular traveltime grid to determine whether points in the rectangular traveltime grid are located between these two spherical computation fronts, 125. If any exist, an interpolation is performed between the two spherical computational fronts to give traveltimes on the rectangular grid, 126, using techniques known to those skilled in the art. That interpolation is discussed further below in reference to FIG. 5. If the new front is within the maximum distance for computation, 127, or if there are no rectangular grid points between the two computation spheres, there are checks on the next front to ensure that the spherical grid spacing never becomes coarser than the spacing in the rectangular grid of slownesses, 129. If it appears that coarser spacing would result at the next computation front, the angular spacings $\Delta\theta$ and $\Delta\phi$ are adjusted to smaller numbers and resampling is performed to produce a finer grid, 130. This adjustment is characteristic of this method and is referred to as "adaptive angular sampling." This is done for $\Delta\theta$ until $\Delta\theta = \Delta\theta_{min}$, after which this check is no longer performed, and likewise for $\Delta\phi$ until $\Delta\phi = \Delta\phi_{min}$. The previous computation front is discarded and an adaptive radial step search is then performed to determine the value of the next step $\Delta r_k$ and, accordingly, the radius of the next computation front, 131. The process returns to the slowness interpolation step and the steps starting at 123 are repeated.

The computation is complete when the computation front reaches or exceeds $r_{max}$, 127. Each PE takes the differences of traveltimes for adjacent slices and scales these traveltime differences into 8 bits, 132. These are sent to the lead PE, 114, in the group. The lead PE packs all the traveltime differences into a minimum number of computer words and writes these out on disk, 106, along with the traveltime for its own first y-slice which is written out in 16 bits. The lead PE under instructions from the control PE, 110, proceeds to the next shot to be assigned to the group, 134.

The steps indicated in FIG. 3 are performed by each PE independent of each other PE in the group. However, as is discussed further below, as a computational front approaches a slice assigned to an adjacent PE in the group, data transfer between the PEs is required. That data transfer occurs in association with steps 124 of FIG. 3.

The finite difference traveltime calculations are performed by a solution of the eikonal equation in spherical coordinates (r, θ, φ) with an origin at the shot position, 3 in FIG. 4, to extrapolate from one computational front to another, step 124, as is given by Schneider. Features taken advantage of by the present method include: (a) use of finite difference equations with unitless amplitude factors, (b) an adaptive radial step, (c) minimizing the effect of backward propagating waves, (d) formulation of a continuous slowness model for mapping from rectangular to spherical coordinates with interpolation, (e) adequate sampling to ensure minimal aliasing, and, (f) using adaptive angular sampling of $\Delta\theta$ and $\Delta\phi$ at each radial step to improve the accuracy and efficiency of the calculations. However, Schneider uses a large array to keep track of the distances to every point in the 3-D grid, which facilitates the interpolation from the spherical to the rectangular grid. Such an array is inefficient in MPP implementations in which each PE has separate traveltime calculation responsibilities. The present method's MPP implementation allows "on the fly" interpolations, thus facilitating reduced storage capacity requirements as compared to the prior art.

Figure 5:
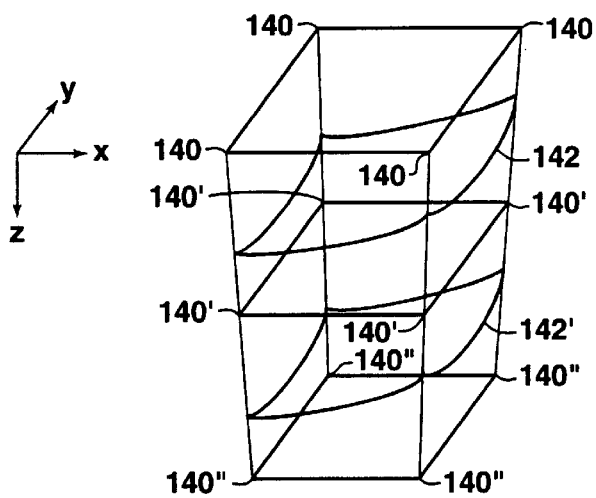
FIG. 5 shows the interpolation between spherical and rectangular coordinates carried out in the invention.

The relation between the spherical computation front and the rectangular grid at the interpolation step, 126 of FIG. 3, is shown in FIG. 5. Points 140, 140' and 140" fall on horizontal planes on an interior portion of the rectangular grid. The source position (and the origin of the spherical coordinate system) is not shown, but would be at some distance vertically above the points in the Figure. Portions of the computational front in spherical coordinates, 142 and 142', at successive values of the radius r are also depicted. For clarity, FIG. 5 does not show the grid points in (θ, φ) on the two spherical computational fronts 142 and 142'. In this example, traveltimes on spherical fronts 142 and 142' would be interpolated to give traveltimes to the points 140' on the rectangular grid. The traveltimes to points 140", on the other hand, cannot be determined until a later spherical front is calculated. Once all traveltimes for all the rectangular grid points between the fronts 142 and 142' have been obtained, there is no longer a need to keep the front 142. Traveltime interpolation would then proceed using 142' and the next spherical front.

Figure 7A:
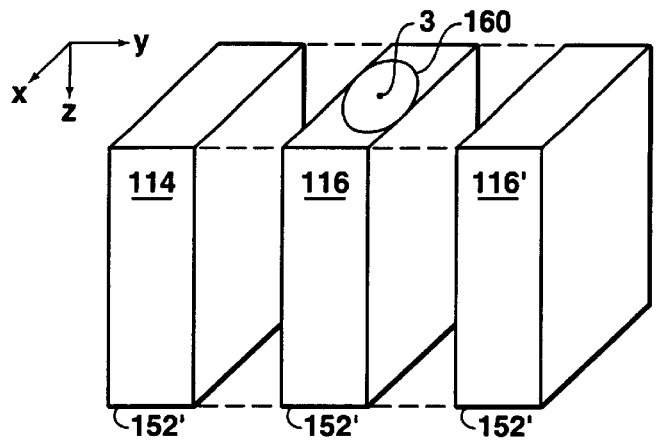
FIGS. 7A and 7B depict the data exchange process that takes place at the boundaries between slices.
Figure 7B:
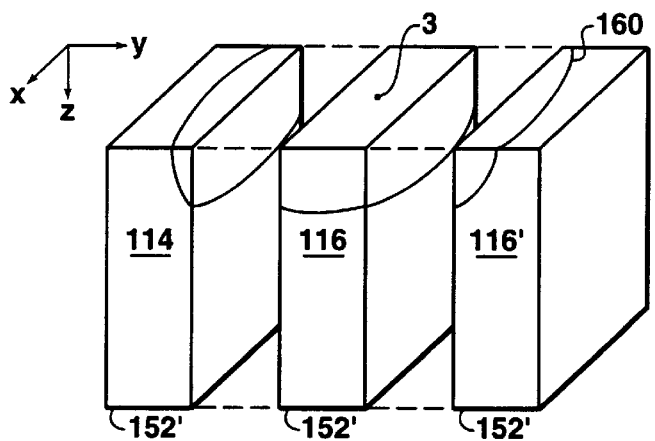

The above process, in which each PE independently calculates traveltimes for the slices for which it is responsible, does not require interaction with other PEs in the group. However, as the computational front approaches an adjacent slice assigned to a different PE in the group, data transfer between the PEs may be required to allow each PE to continue the independent traveltime calculation process. The data to be transferred may include traveltime field data, slowness data, spatial traveltime derivatives, or other, depending on the embodiment involved. The data transfer process between the PEs, 114 and 116, in a group, 112, is discussed with reference to FIGS. 7A and 7B. FIG. 7A shows an exploded view of a portion of the subregion shown in FIG. 6. For clarity, the individual y-slices in each set 152 in FIG. 6 are not shown separately, but rather are depicted in FIGS. 7A and 7B solely as slice block 152'. This depiction is for purposes of simplifying the following discussion only. In a preferred embodiment, the shot location, 3, is above, below, or at the surface of the earth, but will in any case be on the surface of or within the volume of the subregion, 151. Also for clarity, the x and y axes have been rotated by 90° compared to FIG. 6. Finally, for illustrative purposes only, three PEs are shown as being part of the group, 112. These are the lead processor, 114, and two other PEs in the group, 116 and 116'. As is shown in FIGS. 7A and 7B, the lead PE, 114, will typically be responsible for y-slices with smaller y-coordinate values than are associated with the other PEs in the group. This facilitates traveltime data storage, as is discussed further below. Also shown in FIG. 7A is a computational front 160 for shot location 3, which was computed by PE 116. As is indicated, the computational front is confined to the y-slices for which PE 116 is responsible. For the spherical front calculation depicted in FIG. 7A, the other PEs, 114 and 116' have been idle and the steps given in FIG. 3 were carried out only by PE 116.

FIG. 7B shows the computation front 160' at a later stage of the spherical front calculations in each of the slice blocks, 152'. The computational front is no longer confined to a single PE. Instead, the PEs in the group must exchange information about the components of the computational front at their common boundaries. To continue the solution of the eikonal equations, data in PE 116 must be transferred at these boundaries to the adjoining PEs 114 and 116' and vice versa. As noted earlier, a given value of 0 defines a circle on the boundary between adjacent PEs. The advancing front calculations in this invention proceed at successive increments in r; therefore, the data transfer between PEs occurs at a fixed θ and all φ for each r. This simplifies the indexing of the points at which data must be transferred, and is a notable advantage of the present method. The need for this computational front data transfer will depend on the number of slices involved, the location of the shot position, the range over which traveltime will be required for the shot position, and other factors which will be understood to the skilled in the art.

Figure 8:
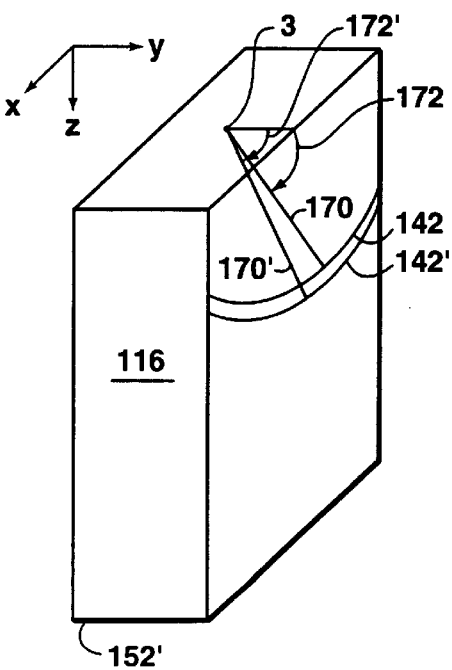
FIG. 8 shows the characterization of the computational front at the interface between two PEs.

This data transfer/indexing feature is illustrated in FIG. 8, where a block 152', for which a PE, 116, is responsible is shown. Also shown are two successive spherical computational fronts, 142 and 142', at a point for which the information must be passed to another PE (not shown). With the coordinate system as defined, the points on the front 142 to be communicated to the next processor are defined by a fixed angle θ, 172. Different points on the front, 142, will have the same radius r, 170, in the spherical coordinate system and different angles φ, not shown. The next spherical computational front, 142', is characterized by radius 170' and angles θ 172'. The data points exchanged between processors can be indexed in terms of a fixed θ and all angles φ.

The present method includes a feature which evenly distributes the y-slices, and therefore balances the work load among all PEs in a group. For most shots in a survey, this effectively places the source location at the center of one of the processor groups whenever possible. In conjunction with having vertical slices allocated to each PE, the invention ensures that the time for which PE 116 in FIGS. 7A and 7B is solely performing calculations is relatively small, and also ensures that the other PEs in the group begin calculations at approximately the same time. This maximizes the distribution of all necessary calculations across all analysis PEs. If the slices were horizontal, there would always be a period of time for which only one PE in the group will be active; this will be followed by a period when only two PEs in the group are active; and so on, thereby inefficiently using the PEs. If there are an even number of PEs, for the same reason, the shot would preferably be placed on a slice near the edge of the block 152' assigned to one of the processors, but close to the middle of the processor group. That assignment ensures that other PEs quickly begin calculations, thereby increasing MPP throughput. As the shot location approaches the edge of the survey, the shot is skewed toward the outer PEs and the computation proceeds with some loss of efficiency since the other PE's cannot as quickly initiate calculations.

The PE designated as the lead PE, 114, is also responsible for the task of writing the traveltime data, after they have been interpolated to a rectangular grid. This was discussed above in reference to Step 132 of FIG. 3. The processors that are not lead processors, 116, send the packed traveltime data to the lead PE, 114, after all the traveltime calculations for the shot have been performed The lead PE. 114, accumulates the information from all the PEs in the group through inter-processor communication. At this point, the lead PE, 114, writes out the packed traveltime information to the output disk 106. This was mentioned above with reference to 106 in FIG. 2 and 134 in FIG. 3. Specifically, the lead PE, 114, writes the traveltime data for its first y-slice, (the one with minimum y-value), in 16 bit format. The traveltime data for all the other y-slices in the group are stored in 8 bit format in incremental form, i.e., for any other y-slice, only differences between the computed traveltimes and the accumulated total of the prior differences. This incremental format makes it possible to pack the data without accumulating errors, leading to reduced data storage and data transfer requirements. This method of storing incremental bits will be familiar to those knowledgeable in the art. The traveltime fields when written out to disk are in depth slices, with each depth slice being partitioned into constant x-vectors. This is the most convenient order in which the data can be stored for calculations involving traveltimes from surface seismic locations. Those knowledgeable in the art will recognize that for crosswell tomography applications, it may be more convenient to have the primary data sorting in vertical slices. The present disclosure of the order in which the data are stored is not a limitation of the invention.

After the lead processor has written out the traveltime data to disk, 106 in FIG. 2, it sends a signal to the control processor, 110. The control processor checks to see if there are any more shot locations for which traveltimes are to be computed. If so, the control processor, 110, initiates the process of transmitting information on the next shot location to the processor group, 112. The processor group then is performs the computations for the new shot location. This provides for a dynamic load balancing between the groups of PEs. When a group of PEs completes its assigned traveltime computations for a shot location, it simply moves on to the next shot position for which calculations are required.

When the control processor, 110, determines that traveltimes have been calculated for all the shot locations for a shot line, it sends a signal to the host computer, 108. At this point, the host computer, 108, starts reading the traveltime data for that shot line off the disks, 106, and writes that data onto tape, 102, or other mass storage device, for use in migration or other seismic processing techniques.

One of the features of the invention is the ability to stop and restart the traveltime calculations. The desirability of having such a restart feature will be known to those familiar with the art. For example, a natural restart point is when all the shots in a line have been computed. In addition, stops and restarts may be initiated by the analyst for purposes such as maintenance of the MPP. A unique feature in a preferred embodiment of the present method allows the restart feature to be automatically used in cases where, due to complications in the velocity model, the memory available on the individual processors becomes inadequate. In such cases, an error message is sent by the PE that is running out of memory to the control PE, which then starts shutting down the other groups of PEs. After all the groups have been shut down, the control processor assigns an increased number of PEs to each group, and calculations are then restarted. This ability to do a dynamic reallocation of the processors is an advance over prior art.

The above method can be used in a number of different seismic processing applications. For example, the method can be used to generate traveltimes for prestack Kirchhoff time or depth migration. An alternate application of the generated traveltimes from this invention is in tomographic inversion of crosswell seismic data.

It should be understood that the invention is not to be limited to the foregoing which has been set forth for illustrative purposes. Reduction of this method to 2-D traveltime computations will be obvious to those skilled in the art. As mentioned above, there are other methods, besides the solution of eikonal equations used in the preferred embodiment, that could be used for computation of traveltime fields.

For example, a dynamic programming approach based on Schneider et. al could be employed. Specifically, the scheme involving an expanding series of "necklaces" around the source location, which is similar to the expanding computational front discussed above in the preferred embodiment, could be implemented in the present invention A finite difference solution of the wave equation could also be used to compute traveltime fields. Means for implementation of these and other methods on an MPP will be apparent to those skilled in the art without departing from the true scope of the invention.

What is claimed is:

1. A method of computing traveltime fields for a geophysical model of the subsurface of the earth, said method involving a computer system having multiple processing elements, comprising the steps of:
    a) assigning analysis tasks to at least one group of said processing elements, each said group having at least one said processing element;
    b) assigning to at least one of said processing elements the control task of transmitting to each said group the locations of shot positions for which said computations are to be performed;
    c) downloading slowness data to each said group; and
    d) computing said traveltime fields for said shot positions using said slowness data, wherein each said processing element in each said group computes said traveltime fields for slices of said subsurface independently of each of the other processing elements in said group.

2. The method of claim 1, wherein, in each said group, traveltime field data are transferred between said processing elements assigned adjacent pairs of said slices in said subsurface.

3. The method of claim 1, wherein, in each said group, slowness data are also transferred between said processing elements assigned adjacent pairs of said slices in said subsurface.

4. The method of claim 1, wherein, in each said group, spatial traveltime derivatives are also transferred between said processing elements assigned adjacent pairs of said slices in said subsurface.

5. The method of claim 1, wherein said control processing element in addition performs the task of designating the number of said processing elements in each of said groups.

6. The method of claim 5, wherein said designation is a fixed number of said processing elements in each said group determined by said control processing element.

7. The method of claim 5, wherein said designation is dynamically reallocated by said control processor.

8. The method of claim 1, wherein a traveltime calculation simulation is performed to determine the number of said processing elements in each said group.

9. The method of claim 1, wherein the number of slices to be processed by each said processing element in each said group is determined by a fixed predetermined allocation.

10. The method of claim 1, wherein said control processing element in addition performs the task of designating a lead processor in each group.

11. The method of claim 10, wherein, for each said group, said lead processing element performs the tasks of
    a) determining the number of said slices to be processed by said group,
    b) determining the number of said slices to be processed by each processing element in said group, and
    c) assigning said slices to said processing elements in said group.

12. The method of claim 10, wherein said control processing element initiates said task of transmitting said locations of said shot positions element in response to signals received from said lead processors.

13. The method of claim 10, wherein for each said group said analysis processing elements transmit said traveltime fields to said lead processing element in said group.

14. The method of claim 1, wherein said traveltime fields are computed by interpolation from a spherical coordinate calculation of a propagating computational front.

15. The method of claim 1, wherein
   a) said slices are vertical slices of said subsurface;
   b) a first reference angle for said spherical coordinates is measured from a horizontal direction parallel to said vertical slices, and,
   c) a second reference angle for said spherical coordinate system is measured from a horizontal direction perpendicular to said vertical slices.

16. The method of claim 1, wherein said slowness data is specified on a rectangular grid corresponding to said subsurface.

17. The method of claim 1, wherein the traveltime fields are computed on a rectangular grid corresponding to said subsurface.

* * * * *